Patented Dec. 11, 1934

1,984,153

UNITED STATES PATENT OFFICE 1,984,153

SYNTHETIC RESIN AND COMPOSITION CONTAINING IT

Gordon D. Patterson, Wilmington, and Roy Allen Shive, Bellemoor, Del., assignor to E. I. du Pont de Nemours & Company, Wilmington, Del., a corporation of Delaware No Drawing. Application October 26, 1929, Serial No. 402,790

6 Claims. (Cl. 260—8)

This invention relates to the art of synthetic resins and compositions containing them and, more particularly, to methods of improving resinous condensation products of polyhydric alcohols and polybasic acids and compositions containing them.

Various methods have been proposed for manufacturing polyhydric alcohol-polybasic acid resins and compositions containing such resins, but previous products with which we are familiar, which were sufficiently flexible for most practical applications, had either insufficient water resistance, or were too slow drying, and their use was therefore restricted in many fields for which their other desirable characteristics made them highly desirable.

We have discovered that various useful properties, such as improved water resistance, increased rate of set-up and increased hardness, can be imparted to modified polyhydric alcohol-polybasic acid resins by treating them with suitable agents, such as litharge. This may be carried out in various ways, although we have herein indicated the two preferred methods, which include the cooking of the agent with the completed or substantially completed resin, or its incorporation into a composition containing the resin along with the pigment combination.

By the term "modified polyhydric alcohol-polybasic acid resin", as used herein, we mean the resinous condensation product resulting from the interaction of one or more polyhydric alcohols, one or more polybasic acids, and one or more of the following ingredients, to-wit: drying oils, semi-drying oils, non-drying oils, and monobasic organic acids, especially those derived from drying oils, semi-drying oils, and non-drying oils, with or without other ingredients, such as natural resins and other synthetic resins.

With the above and other objects in view, which will be apparent as the description proceeds, we have set forth our invention in the following specification, and have included the following examples by way of illustration and not as a limitation:

Example No. 1

46.31 parts by weight of phthalic anhydride, 30.96 parts by weight of linseed oil acids and 22.73 parts by weight of glycerol are heated together in an open kettle at 200° C. for about three hours and allowed to cool to 170° C. The product, which is a thin light brown resinous mass, is then treated with 10% by weight of commercial litharge, based on the weight of the finished resin, and stirred thoroughly, holding the temperature at 170° C. for fifteen minutes. The mixture is then thinned with 150 parts by weight of solvent naphtha and centrifuged to remove excess litharge and other undesirable compounds.

Example No. 2

38.64 parts by weight of phthalic anhydride, 27.54 parts by weight of linseed oil acids, 13.34 parts by weight of China wood oil acids and 20.48 parts by weight of glycerol are heated together in an open kettle at 200° C. for four hours, at which stage the resinous material will be of a thin liquid consistency. The finished material is then allowed to cool to 170° C. and 8% by weight (based on the finished resinous product) of commercial litharge is added and stirred vigorously for fifteen minutes, holding the temperature at 170° C. This mixture is then thinned with 135 parts by weight of solvent naptha and centrifuged.

Example No. 3

67.58 parts by weight of China wood oil, and 9.47 parts by weight of glycerol are heated together, in a closed vessel having a condenser, at 225° C. until the mixture is homogeneous, which usually requires about one hour. 22.59 parts by weight of phthalic anhydride are then added and the heating is then continued, holding the temperature at 225° C. for two and a half hours, at which stage the resinous material will have a medium string (as judged by the usual varnish practice). The material is then allowed to cool to 160° C. and 10% by weight of commercial litharge (based on the weight of the finished resin) is added and the mixture stirred vigorously for fifteen minutes, holding the temperature at 160° C. The mixture is then thinned with 150 parts by weight of solvent naptha and centrifuged.

Example No. 4

37.97 parts by weight of phthalic anhydride, 30.80 parts by weight of linseed oil acids, 12.83 parts by weight of China wood oil and 18.40 parts by weight of glycerol are heated together in an open kettle at 200° C, for six hours, at which stage the resinous material will be of a thin liquid consistency. The temperature is then allowed to drop to 170° C. and 7% by weight of commercial litharge (based on the weight of the finished resin) is added and the mixture stirred thoroughly for fifteen minutes at 170° C. The thoroughly stirred mixture is then thinned with 110 parts by weight of a solvent mixture containing equal parts by weight of solvent naptha and turpentine substitute and centrifuged.

The above resins may be used in the manufacture of coating compositions in the usual manner and as indicated in the following examples:

*Example No. 5*

| | Parts by weight |
|---|---|
| Iron oxide | 13.7 |
| Lamp black | 2.4 |
| Asbestine | 5.9 |
| China clay | 7.5 |
| Talc | 5.9 |
| Litharge-treated resin from Example 1 | 13.0 |
| Solvent naptha | 51.6 |
| | 100.0 |

The pigments are mixed with sufficient of the resin, dissolved in solvent naptha, to develop a consistency suitable for grinding in one of the standard devices for grinding and dispersing pigments. Following the normal grinding period, the composition is thinned to application consistency with the remainder of the resin solution and such additional naptha as may be necessary.

*Example No. 6*

| | Parts by weight |
|---|---|
| Carbon black | 0.5 |
| Resin solution of Example 1 | 92.16 |
| Cobalt linoleate (drier) | 1.00 |
| Denatured ethyl alcohol | 0.5 |
| Hi-flash naptha | 4.54 |
| Turpentine substitute | 1.3 |
| | 100.00 |

A black enamel is formed by grinding the pigment with enough of the resin to give a good grinding consistency and thinning with the remainder of the formula (that is, the rest of the resin, the solvents and the drier).

*Example No. 7*

| | Parts by weight |
|---|---|
| Substantially zinc oxide free lithopone (i. e., containing less than 0.01 of 1% of zinc oxide) | 34.98 |
| Chinese blue | 1.79 |
| Resin solution of Example 4 | 50.00 |
| Cobalt linoleate (drier) | 1.60 |
| Hi-flash naptha | 3.71 |
| Turpentine substitute | 7.92 |
| | 100.00 |

A blue enamel is prepared by mixing the above ingredients in the manner indicated for Example No. 6.

By way of illustration, the following examples show incorporation of agents during the process of pigmenting the resin to form a pigmented film-forming composition:

*Example No. 8*

| | Parts by weight |
|---|---|
| Iron oxide | 8.4 |
| Carbon black | 1.6 |
| Asbestine | 3.8 |
| China clay | 4.8 |
| Talc | 3.8 |
| Litharge | 0.7 |
| Resin | 14.1 |
| Hi-flash naptha | 18.8 |
| Mineral spirits | 16.6 |
| Toluol | 27.4 |
| | 100.00 |

The resin used in this example was prepared by mixing the following ingredients and heating for approximately two hours at 225° C.:

| | Parts by weight |
|---|---|
| Glycerol | 20.37 |
| Phthalic anhydride | 37.34 |
| Linseed oil acids | 29.38 |
| China wood oil acids | 12.91 |
| | 100.00 |

The resin and litharge in the above formula, together with sufficient naptha to reduce resin viscosity and permit grinding, are intermixed and ground in a suitable device, such as a ball mill, for several hours, or until a uniform state of fineness and distribution has been attained. Then the pigments are added, together with additional naptha to develop grinding consistency, and the composition subjected to the period of grinding standard for the product, say 12 hours, in a ball mill operation. The mill charge is then reduced to suitable application consistency with naptha.

*Example No. 9*

| | Parts by weight |
|---|---|
| Asbestine | 9.7 |
| China clay | 4.6 |
| Lithopone | 11.6 |
| Carbon black | 0.1 |
| Barytes | 17.1 |
| Silica | 8.6 |
| Litharge | 1.1 |
| Resin | 10.6 |
| High flash naptha | 31.7 |
| Mineral spirits | 4.9 |
| | 100.0 |

The resin used in this example was prepared by mixing the following ingredients and heating for approximately 3 hours at 200° C.:

| | Parts by weight |
|---|---|
| Glycerol | 22.73 |
| Phthalic anhydride | 46.31 |
| Linseed oil acids | 30.96 |
| | 100.00 |

The litharge is efficiently mixed into the resin solution (prepared with a portion of the naptha), the pigments added at once and sufficient additional naptha added to develop a consistency suited to the grinding or dispersing device to be used. Following a normal dispersing cycle, the product is reduced to the desired application consistency with naptha.

In the method of carrying out our invention by incorporating the litharge as part of the pigment combination, our preferred practice includes:

1. Use of litharge having a minimum initial particle size,
2. Reducing the particle size further and dispersing the litharge uniformly in the resin solution prior to addition of pigments,
3. Thorough mixing and grinding after pigment addition,
4. Presence of all resin and all litharge in grind.

However, in many cases, the desired improvement can be obtained by efficiently mixing the litharge into the mill base, following the normal grinding period, or into the finished product; compositions so treated normally require larger quantities of litharge and are more likely to be subject to changes in consistency on ageing.

Although the above examples are limited to the use of glycerol and phthalic anhydride, these may be replaced in whole or in part by other polyhydric alcohols and other polybasic acids. Similarly, the linseed oil acids, China wood oil acids and China wood oil used as the modifying ingredients, in the above examples, may be replaced in whole or in part by other ingredients, such as perilla oil, fish oil, soya bean oil and other drying and semi-drying oils or the acids derived from these oils, as well as non-drying oils or the acids derived from non-drying oils, and various resins, such as rosin, Congo, kauri and dammar.

Likewise, although the above examples are limited to the use of litharge as the agent for imparting the desired water resistance and other special properties, we desire to have it understood that equivalent agents, such as litharge containing substances, may be used.

It will also be apparent that although only two specific methods have been set forth above for the incorporation of the litharge, each of these methods may be modified in various ways. For example, the litharge may be added at any time after partial esterification has taken place, or by subsequently reheating the resin and incorporating the litharge therewith. Similarly, the excess litharge, and other undesirable compounds, may be removed by other means than centrifuging, such as sedimentation or filtration after solution.

Likewise, with resins of a liquid consistency, we have found it to be satisfactory to incorporate the litharge merely by agitation therewith, although heating may be resorted to if desired.

We also desire it understood that, where desired, treatment of the resin in the manner described herein may be repeated several times to effect the improvement desired. Other methods within the scope of the appended claims will readily suggest themselves to those skilled in the art, and such methods may be substituted for those set forth herein.

We desire to point out that the amount of litharge which is to be used will vary with the particular resin, with the pigment combination, and with the method and apparatus used in treating the resin with the litharge. In general, the shorter the oil length, the greater the quantity of litharge required. Also, the smaller the particle size of the litharge or the more efficient the mixing, the less the quantity of litharge required. For most purposes we have found that it is satisfactory to start with from 1 to 10% of litharge, based on the resin, and this results in the retention in the ultimate composition of from a trace to 5% of soluble lead, based on the resin.

While some excess of litharge may generally be used in the method set forth in Examples 1–4 without disadvantageous results, and sometimes even with advantage to accelerate the reaction, it is desirable to remove or render this excess inactive to avoid slow progress of the reaction in the finished product. Otherwise, such continuing reactions might impair the latter by separation of insoluble lead compounds or by causing livering, gelling, brittleness, or poor adhesion. When practicing the method set forth in Examples 8–9, however, it is not possible to remove the agent when it has once been added. Consequently, greater care must be taken, when practicing this method, to avoid using an objectionable excess.

Although we have stressed herein the improved water resistance, the increased rate of set up of the resulting composition, and the increased hardness, which are imparted to modified polyhydric alcohol-polybasic acid resins by our invention, we desire to have it understood that there are other important advantages, such as the elimination of after-tack. These advantages are especially important in the field of quick drying enamels, or undercoats for metals, such as automobiles, in which it is desirable that the film set up quickly to a degree of hardness which will permit the carrying out of such operations as knife glazing, sanding, or recoating within specified time limits at as low a temperature as possible, and preferably at room temperature.

From the above explanation and examples it will be apparent that we have developed new and useful methods of treating modified polyhydric alcohol-polybasic acid resins, which gives them improved water resistance, an increased rate of set up, and increased hardness, as well as other desirable properties, and renders them highly useful for a variety of commercial uses.

It will also be apparent that we have developed new and useful coating compositions containing such resins, and that these resins may also be incorporated in other types of compositions, such as in varnishes, impregnating compositions and molding compounds.

While we do not desire to be restricted by any particular theory underlying our invention, we believe that in modified polyhydric alcohol-polybasic acid resins drying is retarded and water sensitivity is increased due to the presence of free glycerol or only partially combined glycerol. It is well known that glycerol reacts with litharge to form a complex insoluble substance. By taking advantage of this unique reaction of litharge and litharge containing compounds with glycerol and the partially reacted glycerol of the resin reaction, and treating such resins with litharge, we have found that the desired improvement is effected, and we believe that it is due to the removal of those bodies indicated herein as being responsible for the poor drying and water sensitivity characteristics.

As many apparently widely different embodiments of this invention may be made without departing from the spirit and scope thereof, it is to be understood that we do not limit ourselves to the specific embodiments thereof except as defined in the appended claims.

We claim:

1. A composition of matter comprising the resinous reaction product of glycerol, phthalic anhydride, and a member of the group which consists of drying oils and drying oil acids, litharge in the ratio of from substantially 1–10% of the weight of the resin, and pigment and solvent, said composition drying rapidly and being highly water resistant when laid down in thin films.

2. A process of producing resins having improved water resistance and rapid drying, which comprises reacting glycerol, a drying oil and litharge in an amount not exceeding 10% of the glycerol and drying oil, adding phthalic anhydride, and heating to resinification.

3. A composition of matter comprising in combined form the resinous reaction product of glycerol, a polycarboxylic acid, and a member of the group which consists of drying oils and drying oil acids, and litharge in the ratio of from substantially 1–10% of the weight of the resin, said composition drying rapidly and being highly water-resistant when laid down in thin films.

4. A process of producing resins having improved water resistance and rapid drying which comprises reacting glycerol, a polycarboxylic acid, and at least one member of the group consisting of drying oils and drying oil acids, and adding litharge thereto in the ratio of 1–10% of the weight of the resin.

5. A rapidly drying, water resistant, resinous composition of matter containing in combined form litharge and the radicals of glycerol, phthalic anhydride, and drying oil acids, said composition having from a trace up to 5% of soluble lead.

6. A process of improving the water resistance of resins formed from glycerol, phthalic anhydride, and a member of the group consisting of drying oils and drying oil acids which comprises heating the resin ingredients at a temperature of 170–225° C. for 2½ to 6 hours until a resin is produced, allowing the resin to cool but not solidify, adding slowly and with agitation 1 to 10% litharge based on the weight of the resin, cutting the resin in a solvent, and removing free litharge and any insoluble lead compounds from the resin solution.

GORDON D. PATTERSON
ROY ALLEN SHIVE.